Jan. 27, 1942.  W. MANZ ET AL  2,270,953
ELECTRICAL CONDENSER
Filed March 30, 1939   2 Sheets-Sheet 1

INVENTORS
WALTER MANZ, JOSEF SCHNIEDERMANN,
OSKAR SCHNEIDER, MICHAEL WELLHÖFER,
LUDWIG LINDER, HEINZ BESSER AND
WILLY VOIGT
BY
ATTORNEY

Jan. 27, 1942. W. MANZ ET AL 2,270,953
ELECTRICAL CONDENSER
Filed March 30, 1939 2 Sheets-Sheet 2

INVENTORS
WALTER MANZ, JOSEF SCHNIEDERMANN,
OSKAR SCHNEIDER, MICHAEL WELLHÖFER,
LUDWIG LINDER, HEINZ BESSER AND
WILLY VOIGT
BY H. S. Snover
ATTORNEY Patented Jan. 27, 1942

2,270,953

UNITED STATES PATENT OFFICE 2,270,953

ELECTRICAL CONDENSER

Walter Manz, Josef Schniedermann, Oskar Schneider, Michael Wellhöfer, Ludwig Linder, Heinz Besser, and Willy Voigt, Berlin, Germany, assignors to Fides Gesellschaft für die Verwaltung und Verwertung von gewerblichen Schutzrechten mit beschränkter Haftung, Berlin, Germany, a corporation of Germany Application March 30, 1939, Serial No. 264,916
In Germany November 24, 1937

5 Claims. (Cl. 250—16)

This invention relates to improved condensers for use in ultra high frequency circuits.

Condensers with low self-inductance are required for a great many purposes and fields in which electrical condensers are employed, especially in connection with means designed to eliminate disturbing actions.

To satisfy demands in this regards, specially wrapped or wound condensers, for instance, condensers with protruding foil, or folded condensers, or condensers having the electrode strips inserted at certain points, have been suggested so as to diminish the self-inductance inherent in them. Another step in the same direction has been to make the connections between the wrapped or rolled condenser and the terminals bifilar (two-wire) or coaxial or concentric. However, all of these steps prove inadequate whenever the desideratum is to insure maximum utilization of the true capacity or to short-circuit ultra-high frequencies, because the residual inductances in the leads, though low, nevertheless represent a high impedance.

Now, the present invention discloses ways and means adapted to make condensers with a self-inductance value that is practically negligibly low even for ultra-high frequencies. The basic and the starting idea has been that, no matter how good the construction of low-inductance leads, the inductance can never be as low as if there were no leads present at all. Hence, the condenser coat is directly united with the current-carrying line or circuit. This means that the branch point where the disturbing frequency is branched off from the current-carrying line is disposed upon the coat of the condenser.

For carrying the solution into practice, there are a number of chances which, for the sake of better understanding, shall first be discussed by reference to the drawings, in which.

Figure 1:
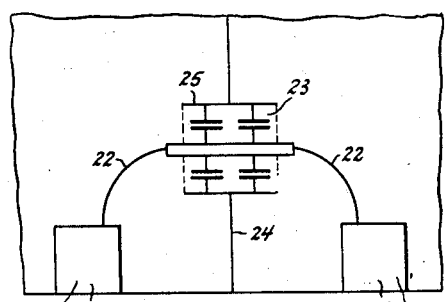
Fig. 1 is a fundamental arrangement illustrating the principle of this invention.

In a first embodiment, the condenser, as known in the prior art, could have the form of a hollow wound or wrapped condenser, with the line carrying the current and to be freed from disturbing actions being passed through the axis thereof. It may be mentioned at this juncture that the chief application of condensers of this kind is where they serve as ducts or lead-ins in a way so that one pole is united with the line to be rid of disturbances, while the other pole (being preferably joined to the casing) is connected with the grounded part of the apparatus, say, a metallic wall. A fundamental arrangement illustrating the principle of this application is shown in Fig. 1. Referring to Fig. 1, suppose 20 is the generator of disturbing actions, while 21 is an apparatus from which disturbances should be precluded. The line 22 which serves to conduct current between 20 and 21 is brought through the metal wall 24 by way of the bush or wall duct or lead-in condenser 23. The latter which serves the object to rid line 22 of disturbing frequencies is united with one pole of the line 22 which is brought through the center of the condenser, whereas the other pole is united with the casing 25 so that it is connected with the earthed metal wall 24. Now, this action of the condenser 23 will be optimal only if there is no inductance between the capacity and the line 22. For this reason according to the invention, the condenser coat is connected directly with the current-carrying line, while leads are radically precluded.

Figure 2:
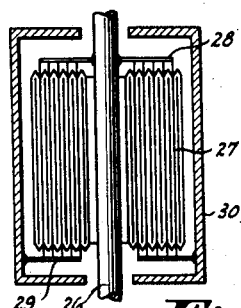
Fig. 2 is a cross-section of a practical embodiment of a condenser of this invention.
Figure 3:
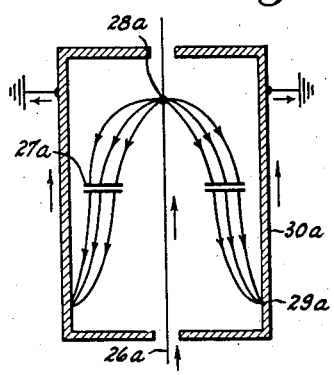
Fig. 3 is a schematic showing of the path of current flow of a condenser shown in Fig. 2.

A practical embodiment of a condenser as here disclosed is shown in Fig. 2. 26 is the conductor to be rid of disturbing actions; 27 is a hollow, wrapped or wound condenser comprising coats protruding at the ends. One of these coats as indicated at 28 is soldered in itself and also soldered together with the conductor 26, while the co-operating coat 29 is in direct connection with the casing 30. Merely for the sake of greater clarity of illustration, it is shown in Fig. 2 as being spaced apart from the wrapped condenser 27. A schematic representation of the path of current flow through this bushing or duct condenser is illustrated in Fig. 3, where similar parts (bearing index a) are designated by the same reference numerals as in Fig. 2.

The assumption is made that the disturbing potential traverses the line 26 or 26a from below in the direction of the arrow. 28 or 28a indicates the branching point where the disturbing wave flows off by way of capacity 27, 27a to the casing 30, 30a, at the place marked 29, 29a, respectively. This branch point 28, 28a lies directly on the coat of the condenser 27, 27a so that stray inductance in the short-circuit path to ground is avoided. Casing 30, 30a is grounded. As can be seen from Fig. 3, it is not immaterial at what particular point of the casing the ground connection is established. But it will be found expedient, at all events, to provide the grounding exactly at the same level as the branching point so that the casing serves as a return and that thus the inductance of the condenser coats, fundamentally, is reduced by the bi-filar or double paths of current flow. The condenser bushing will thus at the most have the inductance of a conductor presenting the same external dimensions as the condenser.

Figure 4:
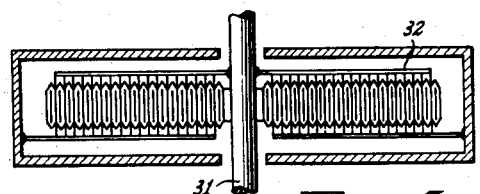
Fig. 4 is a section of a condenser having an increased diameter and a decrease in its thickness.

Now, inasmuch as the inductance of a conductor grows in proportion to its length and decreases as its diameter, it would appear advantageous according to the present invention to make the condenser of as little length as feasible, but of the greatest possible diameter, as shown in Fig. 4. The breadth $b$ of the wrapped condenser should be therefore as little as feasible in contrast to the diameter of the winding or wrapping $d$, in other words, theoretically $b/d \approx 0$. It will be understood, of course, that certain limitations are imposed upon this aim in practice. However, quite apart from that, there arise other factors imposing a certain limitation upon the ratio $b/d$. For if the diameter becomes unduly great, there arises what is called a cross inductance resulting from the long paths of current from conductor 31 to the last convolutions of the wrapper for instance, at the point marked 32.

In connection with research work resulting in the evolution of the present condenser, in the light of what precedes, it has also been found that as a further construction rule that it is advisable to choose the inside diameter of the condenser as large as feasible in order that the thickness of the wrapping (outside radius less inside radius) may be most favorable in its dimension. In this case, the conductor passed through the axis of the wrapped condenser does not fill up completely the axial space of the condenser so that, contradistinct from what is true of Fig. 2, for instance, it could not be used as a winding mandrel, for which reason it would seem, at first sight, that leads to the coat would again be required. To avoid this, the current-carrying conductor inside the condenser is expanded and made tubular, and this tubular part may then be employed as a winding mandrel.

Figure 5:
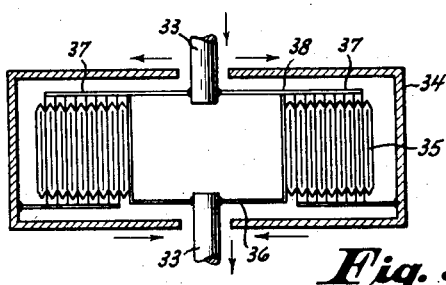
Fig. 5 is a section of a modification of Fig. 4.

An embodiment of this idea is shown in Fig. 5. The current-carrying conductor 33 enters into the condenser casing 34, and its tubular expanded portion 36 is brought through the wrapped condenser 35. The current from which is to be eliminated a disturbing action is divided at the junction point between conductor 33 and tubular part 36, and it flows in a way as indicated by the arrows through the tubular part 36. The latter being part and parcel of the current-carrying conductor will thus be in direct connection with the coat 37 so that again the branching point 38 for the interference voltage and the signal voltage is located directly at the capacity.

Figure 6:
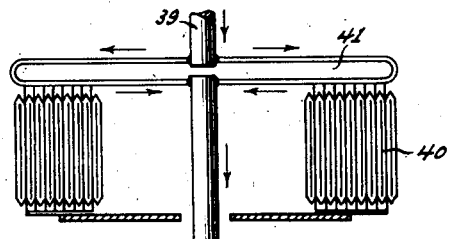
Fig. 6 is a section showing a still further modification of Fig. 4.
Figure 8:
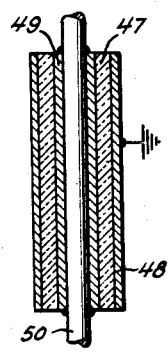
Figure 9:
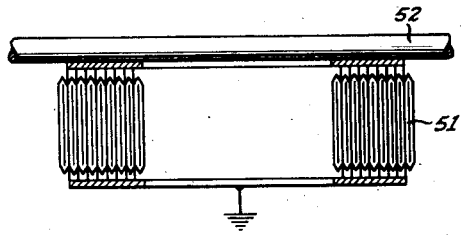
Figure 10:
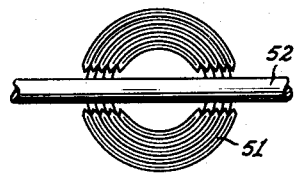
Figure 11:
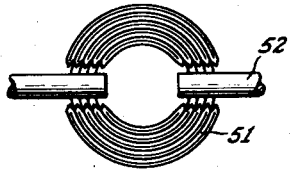
Figure 12:
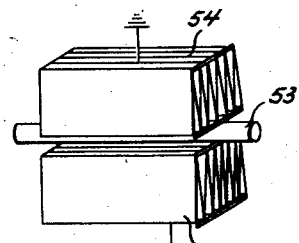
Figure 13:
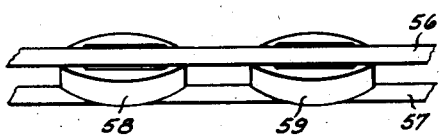
Figure 14:
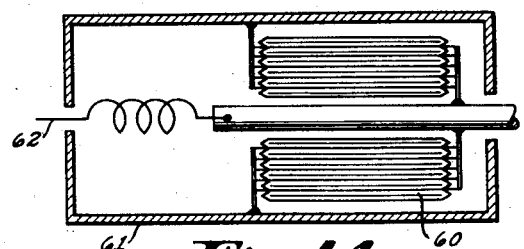

Similarly other embodiments are feasible, and of these another exemplified construction is shown in Fig. 6. A conductor 39, say, a cable comprising several conducting wires is split open resulting in the form of a hollow disk 41 which is in direct contact with the coat of the condenser 40. Fundamentally speaking, it is possible to fit or draw over a conductor 39, say, a solid disk, and to solder the two together, the circumference of the said disk being united with the coat of the condenser 40. Where sufficiently high frequencies are dealt with, such an arrangement will prove adequate inasmuch as the radio frequency currents will flow around the outside of the disk because of skin effect.

In a special embodiment of a condenser comprising a current-conducting lead or line brought through the interior, for instance, the disk-like expansion of the current-carrying conductor or line is first secured on the coat of the condenser, whereupon a disc member with a central opening for the cable or the like to be threaded through is formed to suit such cable gauges as are available and in stock. Finally, connection with the cable is established by any suitable means, such as soldering. For such an embodiment for which far fewer sizes will have to be kept in stock, there are a number of other ideas which will prove useful in practice. For instance, the disk-shaped body or structure, that is, the expanded part of the current-carrying conductor or like, could be made in the form of an iris diaphragm or the like which is adjusted to the cross-section of the line to be rid of interference or troublesome currents and which then is fixedly connected therewith.

Figure 7:
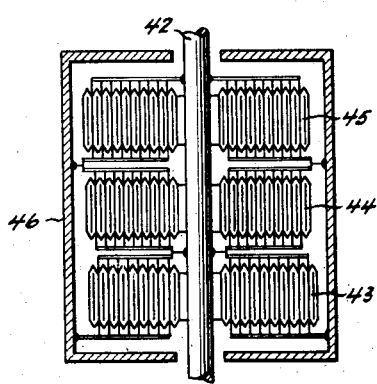
Fig. 7 is a section of a condenser wherein several units are arranged in parallel.

What should also be mentioned is that a condenser bush or duct of the kind hereinbefore described need not necessarily contain merely one wrapped structure; on the contrary, it is possible to provide several such wrapped or wound condensers units arranged in parallel as shown, for instance, in Fig. 7. The conductor 42 to be rid of disturbing actions, traverses the wrapped condenser 43, 44, 45; one coat of each of these is in direct connection with the conductor 42, while the co-operating coats are brought to the casing 46. This arrangement offers the additional advantage that residual inductance of the wrapped packets will be cut down still further as a result of such parallel connection.

This invention should not be limited to the specific modifications shown, for example, it lies within the scope of this invention to arrange the condensers between two conductors which are in direct connection with the condenser coats to free the line of disturbances, also, the current-carrying lead, itself, could be made to form a few turns or loop to serve as a choke coil to provide additional reactance.

What is claimed is:

1. A high frequency electric condenser comprising a metallic casing having an aperture centrally located at each end thereof, a separate conductor passing through each one of said apertures, a tubular metallic portion located intermediate each of the ends of said separate conductors and electrically connected thereto, a condenser unit surrounding said tubular portion, one electrode of said condenser unit connected to said tubular portion, the other electrode of the condenser unit connected to said casing.

2. A high frequency electric condenser comprising a metallic casing the length of which is greater than its height, said metallic casing having an aperture centrally located at each end thereof, a separate high frequency line conductor passing through each one of the apertures of said casing, a tubular metallic portion located intermediate each one of the ends of said separate conductor and electrically connected thereto a condenser unit having one of its electrodes connected within said casing to said high frequency conductors, the other condenser electrode connected to the inside wall of said casing.

3. A high frequency electric condenser comprising a metallic casing the length of which is greater than its height, said metallic casing having an aperture centrally located at each end thereof, a separate high frequency line conductor passing through each one of the apertures of said casing, a tubular metallic portion located intermediate each one of the ends of said separate conductor and electrically connected thereto, said high frequency conductors having an enlarged diameter at one end which terminates within said casing to distribute the high frequency current flow therethrough, a condenser unit having one of its electrodes connected within said casing to the enlarged end of said high frequency conductors, the other condenser electrode connected to the inside walls of said casing.

4. A high frequency electric condenser comprising a cylindrical metallic casing the diameter of which is greater than its length, said metallic casing having an aperture centrally located at each end thereof, a separate high frequency line conductor passing through each one of the apertures of said casing, a tubular metallic portion located intermediate each of the ends of said separate conductor and electrically connected thereto, said high frequency conductors having enlarged portions at one end which terminate within said casing to distribute the high frequency current flow therethrough, a condenser unit within said casing, said tubular metallic portion serving as a winding mandrel for said condenser, one of the condenser electrodes connected within said casing to the enlarged portion of said high frequency conductor, the other condenser electrode connected to the inside of said casing.

5. A high frequency electric condenser comprising a cylindrical metallic casing, said metallic casing having an aperture centrally located at each end thereof, a separate high frequency line conductor passing through the apertures of said casing, said high frequency conductor having an enlarged diameter spread out to form a hollow disc member, the condenser unit having one of its electrodes connected within said casing to said hollow disc, the other condenser electrode connected to the inside wall of said casing.

WALTER MANZ.
JOSEF SCHNIEDERMANN.
OSKAR SCHNEIDER.
MICHAEL WELLHÖFER.
LUDWIG LINDER.
HEINZ BESSER.
WILLY VOIGT.